(12) United States Patent
Jain et al.

(10) Patent No.: US 11,831,563 B1
(45) Date of Patent: Nov. 28, 2023

(54) MULTI-TIERED DATA PROCESSING SERVICE

(71) Applicant: Amazon Technologies, Inc., Seattle, WA (US)

(72) Inventors: Saral Jain, Bellevue, WA (US); Chetan Manohar Dandekar, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/711,773

(22) Filed: Apr. 1, 2022

Related U.S. Application Data

(63) Continuation of application No. 16/532,313, filed on Aug. 5, 2019, now Pat. No. 11,297,003, which is a continuation of application No. 15/181,332, filed on Jun. 13, 2016, now Pat. No. 10,382,358.

(51) Int. Cl.
| | |
|---|---|
| H04L 41/044 | (2022.01) |
| H04L 47/70 | (2022.01) |
| H04L 67/1087 | (2022.01) |
| H04L 67/125 | (2022.01) |
| H04L 41/18 | (2022.01) |
| H04L 41/16 | (2022.01) |
| H04L 43/0882 | (2022.01) |
| H04L 43/16 | (2022.01) |

(52) U.S. Cl.
CPC ............ *H04L 47/82* (2013.01); *H04L 41/044* (2013.01); *H04L 41/16* (2013.01); *H04L 41/18* (2013.01); *H04L 43/0882* (2013.01); *H04L 43/16* (2013.01); *H04L 67/1089* (2013.01); *H04L 67/125* (2013.01)

(58) Field of Classification Search
None
See application file for complete search history.

(56) References Cited

U.S. PATENT DOCUMENTS

| | | | |
|---|---|---|---|
| 8,352,692 | B1 | 1/2013 | Jordan |
| 8,805,767 | B1 | 8/2014 | Wang et al. |
| 9,917,735 | B2 | 3/2018 | Park |
| 10,095,701 | B1 | 10/2018 | Faibish et al. |
| 10,853,315 | B1 * | 12/2020 | Faibish ............... G06F 16/137 |
| 2002/0083166 | A1 | 6/2002 | Dugan et al. |

(Continued)

*Primary Examiner* — James A Edwards
(74) *Attorney, Agent, or Firm* — Robert C. Kowert; Kowert, Hood, Munyon, Rankin & Goetzel P.C.

(57) ABSTRACT

A technology is described for operating a multi-tiered data processing service. An example method may include receiving a data rule set used to process data generated by a network addressable device included in a multi-tiered data processing service having computing nodes that are connected using one or more networks, where the computing nodes may have computing capacities to execute a portion of the data rule set using a rules engine. A computing node included in the multi-tiered processing service may be selected to host a portion of the data rule set on the computing node and a portion of the data rule set may be deployed to the computing node, where the data rule set may be registered with the rules engine that executes on the computing node and data generated by the network addressable device may be processed using the rules engine and the data rule set.

20 Claims, 11 Drawing Sheets

(56) References Cited

U.S. PATENT DOCUMENTS

| | | | |
|---|---|---|---|
| 2005/0262168 A1* | 11/2005 | Helliker | G06F 11/1446 |
| | | | 714/E11.119 |
| 2006/0173856 A1 | 8/2006 | Jackson et al. | |
| 2011/0032913 A1* | 2/2011 | Patil | H04W 72/54 |
| | | | 370/338 |
| 2011/0119523 A1 | 5/2011 | Bisdikian et al. | |
| 2012/0197449 A1 | 8/2012 | Sanders | |
| 2012/0236756 A1 | 9/2012 | Bennett et al. | |
| 2015/0205818 A1* | 7/2015 | Darcy | G06F 16/182 |
| | | | 707/822 |
| 2015/0236783 A1 | 8/2015 | Hao | |
| 2016/0071027 A1* | 3/2016 | Brand | G06N 20/00 |
| | | | 706/12 |
| 2016/0247164 A1 | 8/2016 | Salajegheh | |
| 2016/0321095 A1* | 11/2016 | Cropper | H04L 41/0894 |
| 2016/0337441 A1 | 11/2016 | Bloomquist | |
| 2017/0118119 A1* | 4/2017 | Testicioglu | H04L 43/0864 |

\* cited by examiner

MULTI-TIERED DATA PROCESSING SERVICE

CROSS REFERENCE TO RELATED APPLICATIONS

This application is a continuation of U.S. patent application Ser. No. 16/532,313, filed Aug. 5, 2019, entitled "MULTI-TIERED DATA PROCESSING SERVICE," which is a continuation of U.S. patent application Ser. No. 15/181,332, filed Jun. 13, 2016, now U.S. Pat. No. 10,382,358, entitled "MULTI-TIERED DATA PROCESSING SERVICE," which is incorporated herein by reference.

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and even farming equipment may now rely upon electronic sensors and control systems.

Advancements in communication technologies have allowed for even relatively simple electronic devices to communicate with other devices and systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances and light switches offer the possibility of being configured with communication capabilities for purposes of transmitting status and receiving external control communications.

DETAILED DESCRIPTION

A technology is described for a multi-tiered data processing service that includes multiple computing nodes capable of processing data generated by network addressable devices using data rule sets defined by computing service customers or a computing service provider. In this technology, a computing node may be selected to host a data rule set using characteristics of the computing node and the data rule set. These computing node characteristics may consider computing capacity, communication capacity or similar characteristics in placing the data rule set at a computing node. In some examples, network addressable devices may have minimal, very limited, or no computing capabilities. A network addressable device may be one of many devices that create a large network of addressable devices. This "network" is commonly referred to as the Internet of Things (IOT). The network addressable devices may be configured to communicate with services that are accessible via the network, and the services in return may communicate with the devices via the network.

A multi-tiered data processing service may include multiple computing nodes that comprise one or more network addressable devices, intermediate computing nodes (e.g., hub devices and network edge devices), and servers operating in a computing service environment (e.g., "cloud" environment). The computing nodes may be in network communication with one another, and data generated by a network addressable device may be provided to a tiered computing node with more computing capacity and/or communication capacity that analyzes, processes, and/or transforms the data using a rules engine and a data rule set. As a specific example, a data rule set, when executed by a rules engine, may batch data points generated by a network addressable device that has a device temperature sensor and send the batch of data points to a next level tier computing node for further processing. As another specific example, a data rule set may adjust a data sample rate of a network addressable device based on network connectivity to a next level tier computing node.

Illustratively, a computing node included in the multi-tiered data processing service may be selected to host a data rule set and receive data generated by a network addressable device based in part on an amount of computing capacity (e.g., processor, memory, network bandwidth, storage, and/or battery power) used to process the data and based in part on a physical location of the computing node. In one example, a computing service customer may select a computing node to host a data rule set used to analyze, process, and/or transform data generated by the customer's network addressable device. In another example, a data rules management service may be used to select a computing node to host a data rule set using characteristics of the computing node and the data rule set.

Figure 1:
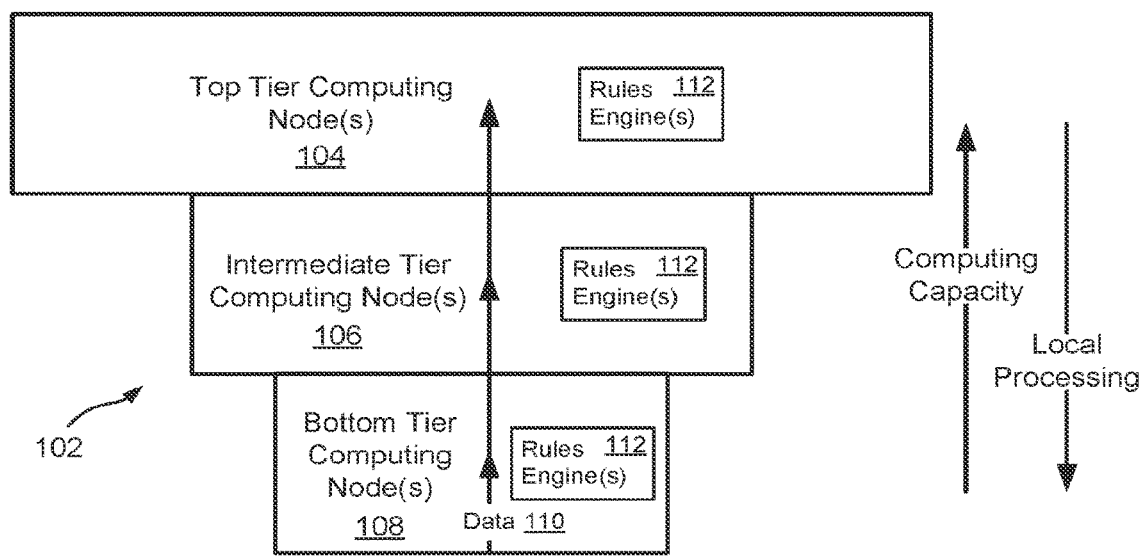
FIG. 1 is a diagram illustrating an example conceptual view of a multi-tiered data processing service used to analyze, process, and/or transform data generated by a network addressable device.

FIG. 1 is a diagram illustrating a high-level example of a multi-tiered data processing service 100 that may be used to analyze, process, and/or transform data 110 generated by a network addressable device. A computing service customer can include (or add) the customer's network addressable devices in the multi-tiered data processing service 100 and utilize computing resources made available via the multi-tiered data processing service 100. The multi-tiered data processing service 100 may include computing node tiers 102 comprising computing nodes (e.g., servers, network edge devices, or network addressable devices) having defined computing capacity and the computing nodes may be in communication with one another by way of a computer network. The computing nodes may host a data rule set (or a portion of a data rule set) and a rules engine 112 used to analyze, process, and/or transform data received from a network addressable device and, in some examples, send data back to the network addressable device. More specifically, data generated by a network addressable device is sent to a computing node that host the rules engine 112 and the rules engine 112 evaluates the data received from the network addressable device.

As illustrated, the multi-tiered data processing service 100 may include a bottom tier of computing nodes 108, an intermediate tier of computing nodes 106, and a top tier of computing nodes 104. While three computing node tiers 102 are shown, the multi-tiered data processing service 100 may include any number of additional computing node tiers. In general, the top tier of computing nodes 104 may have a greater amount of computing capacity as compared to a computing capacity of the intermediate tier of computing nodes 106 and the bottom tier of computing nodes 108. Illustratively, the top tier of computing nodes 104 may include network accessible services that execute on servers within a computing service environment (e.g., a "cloud" environment). The network services may be utilized in performing analysis, processing, and/or transforming of data 110 generated by network addressable devices using a rules engine 112.

Also, in general, the intermediate tier of computing nodes 106 may have a greater amount of computing capacity as compared to the computing capacity of the bottom tier of computing nodes 108 and in some cases the intermediate tier of computing nodes 106 may be used to analyze and/or process data 110 using a rules engine 112. For example, the intermediate tier of computing nodes 106 may include hub devices and network edge devices configured to perform some amount of data analysis and/or processing using a rules engine 112 and a data rule set (e.g., rules used to analyze, process and/or transform data generated by a network addressable device).

The bottom tier of computing nodes 108 may have a lesser amount of computing capacity as compared to the intermediate tier of computing nodes 106 and the top tier of computing nodes 104 used to analyze, process, and/or transform data 110 generated by network addressable devices included in the bottom tier of computing nodes 108. In some cases a network addressable device may include a sufficient amount of computing capacity to process the network addressable device's own data 110 using a rules engine 112 and a data rule set. Data 110 generated by a network addressable device may be sent to one computing node tier 102 selected to host a rules engine 112 and a data rule set used to process the data 110. In one example, a computing node tier 102 may be selected according to an amount of computing capacity used to process the data 110. For example, computing services included in the top tier of computing nodes 104 may be used to process data 110 generated by a network addressable device in cases where the intermediate tier of computing nodes 106 and the bottom tier of computing nodes 108 may not have sufficient computing capacity or services to process the data 110. As a specific example, a network edge device may not include a data storage service used to store an amount of data 110 generated by a cluster of network addressable devices. Therefore, the network edge device may send the data 110 to a server in a computing service environment that hosts a data storage service that can store and process the data 110 generated by the cluster of network addressable devices.

In another example, a computing node tier 102 may be selected according to a physical location of the computing node tier 102 and an amount of computing capacity available on the computing node tier 102 to process the data 110. For example, data 110 in some cases may be analyzed prior to sending the data 110 to a higher-level computing node tier 102 and an action may be performed based on the analysis of the data 110. Therefore, a computing node tier (e.g., bottom tier computing node 108 or intermediate tier computing node 106) may be selected that has sufficient computing capacity to analyze the data 110 and may be in close proximity to a network addressable device that generates the data 110. As a specific example, video data generated by a network addressable security camera located in a building may be analyzed for a security threat using an intermediate tier computing node 106 (e.g., a network edge device) prior to forwarding the video data on to a top tier computing node 104 (e.g., a "cloud-based" network service) for further analysis.

Figure 2:
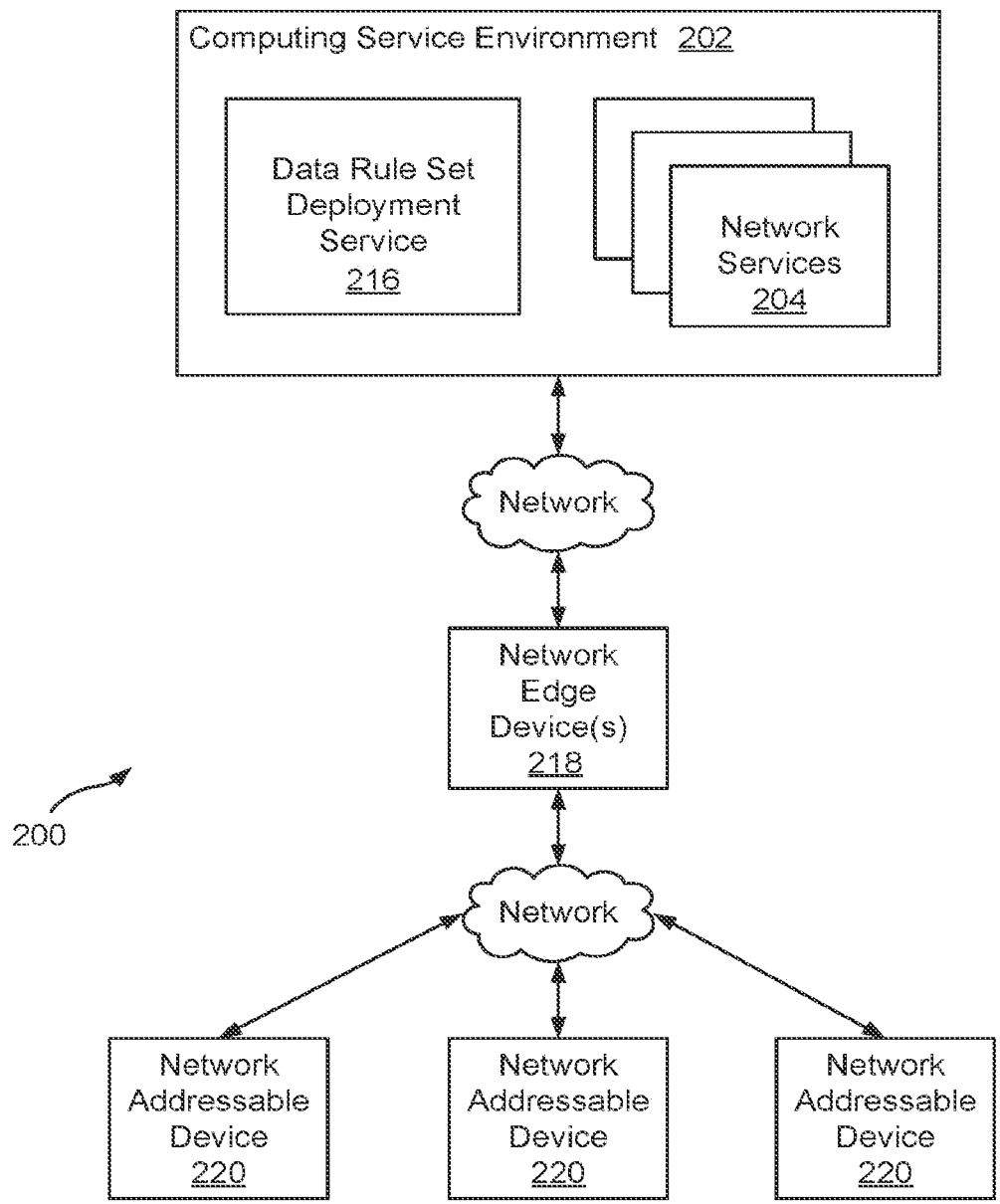
FIG. 2 is a block diagram that illustrates an example system for a multi-tiered data processing service comprising computing nodes having defined computing capacity tiers and the computing node are connected by a network.

FIG. 2 is a block diagram that illustrates an example system 200 for a multi-tiered data processing service comprising computing nodes having defined computing capacity tiers and the computing nodes are connected by a network. More specifically, the system 200 may include network addressable devices 220 that may be in network communication with one or more network edge devices 218 and a computing service environment 202. Illustratively, the network addressable devices 220 may have minimal, limited, or no computing capabilities as compared to other devices in the multi-tiered data processing service. The network edge devices 218 may have greater computing capabilities than that of the network addressable devices 220, and the computing service environment 202 may provide computing capabilities via "cloud-based" network services 204 that may be greater than that of the network edge devices 218.

A computing service customer may register one or more network addressable devices 220 with the multi-tiered data processing service and utilize computing resources available within the multi-tiered data processing service to analyze, process and/or transform the data generated by the customer's network addressable devices 220. In one example, a network addressable device 220 may include a minimal amount of computing resources that can be used to analyze, process and/or transform data generated by the network addressable device 220 using data rules and a rules engine, and forward the data on to a network service 204 in the computing service environment 202 for further processing or storage.

In another example, data generated by a network addressable device 220 may be sent to a network edge device 218 providing an entry point to the computing service environment 202 that includes computing resources used to analyze, process and/or transform the data using data rules and a rules engine. The network edge device 218 may perform an action according to the data rules, and then forward the data on to a network service 204 included in the computing service environment 202.

In yet another example, data generated by a network addressable device 220 may be sent to a network service 204 in the computing service environment 202 to be analyzed, processed, and/or transformed. Network services 204 included in the computing service environment 202 may include computing services, storage services, communications services, networking services, security services, data management services, applications, rules engines, and the like. These network services 204 may be used to analyze and/or process data generated by a network addressable device 220 and the network services 204 may be configured to perform an action based on the analysis. In some cases, the results of analyzing, processing, and/or transforming data received from a network addressable device 220 may be sent back to the network addressable device 220, which may use the results for some purpose, such as evaluating the results and performing some type of action.

In one example, a computing node included in the multi-tiered data processing service (i.e., a network addressable device 220, a network edge device 218, or a network service 204) may be selected to host a data rule set, or a portion of a data rule set, and used to analyze, process and/or transform data generated by a network addressable device 220. A data rule set may be developed for use in association with one or more network addressable devices 220. In one example, a computing service customer may register the customer's network addressable device(s) 220 with the computing service environment 202 and provide a data rule set for use in association with the network addressable device(s) 220. A data rule set may comprise logic used to evaluate data generated by a network addressable device 220 and may include instructions to perform an action based on the evaluation of the data. Some examples of a data rule set, when executed by a rules engine, may perform: batching data points generated by a network addressable device 220, adjusting a data sample rate of a network addressable device 220, or prioritizing data attributes of data generated by a network addressable device 220 sent to a higher tiered computing node included in the multi-tiered data processing service.

As one specific example, a data rule set may be configured to analyze chemical data received from a network addressable chemical sensor located in a swimming pool to determine a chlorine distribution in the swimming pool and generate a notification when the chlorine distribution is not with a tolerance. As another specific example, a data rule set may be configured to aggregate air sample data generated by network addressable sampling devices at a network edge device 218 and forward the aggregated air sample data to a network service 204. Another specific example of a data rule set may comprise a data rule set configured to transform data according to business logic. In yet another example, temperature and humidity data generated by network addressable weather devices located in a forest may be transformed to fire danger readings, like "Low", "Moderate", and "High".

A rules engine may include a service or application configured to execute a data rule set and route related communications to network services 204, network edge devices 218, and network addressable devices 220. A rules engine may be implemented on a computing node using an SDK (Software Development Kit), which may comprise a software framework and a set of client libraries. A rules engine may be used in association with one or more network addressable devices 220 or network edge devices 218 that are registered with the computing service environment 202. In one example, a computing service customer may develop a rules engine for use with the customer's network addressable device(s) 220. The rules engine may be certified for use by a computing service provider and deployed to a computing node included in the multi-tiered data processing service selected to host rules engine and a data rule set.

A computing node may be selected for receipt of data rules and a rules engine by a computing service customer, a computing service administrator, or a computing node may be dynamically selected using computing node classifications and data rule set classifications. As illustrated, the computing service environment 202 may include a data rule set deployment service 216 configured to deploy a data rule set to a computing node selected to host the data rule set. The data rule set deployment service 216 may be used by a computing service customer, or a computing service provider, to select a computing node to host a data rule set and use the data rule set deployment service 216 to deploy the data rule set to the selected computing node. The data rule set deployment service 216 may be accessible via one or more APIs (Application Program Interfaces) or via a management console interface. Alternatively, the data rule set deployment service 216 may be configured to dynamically select a computing node using computing node classifications and data rule set classifications and deploy a data rule set to the selected computing node. The data rule set deployment service 216 is described in greater detail below in association with FIG. 4.

Various factors may be used to select a computing node to host a data rule set. In one example, a computing node may be selected based in part on a computing capacity of a computing node used to process and analyze data using a rules engine and a data rule set. For example, a computing service customer may be provided with computing capacity information (e.g., processing, memory, network bandwidth, or network service information) for computing nodes included in the multi-tiered data processing service via a management console interface and the customer may select a computing node based in part on the computing capacity of the computing node. As an illustration, a customer may be presented with computing capacity information for network addressable devices 220, network edge devices 218, and network services 204, and the customer may select one of the devices or services to host the customer's data rule set.

In one example, a computing node may be selected by first executing a data rule set using computing resources in the computing service environment 202 to measure an amount of computing resources used to execute the data rule set. A computing node can then be identified based on the amount of computing resources used to execute the data rule set. In another example, a data rule set may be benchmarked by first placing the data rule set on a network addressable device 220 that generates data processed using the data rule set and in the case that more computing capacity may be needed, the data rule set may be moved to a network edge device 218 or a network service 204. In another example, a data rule set may be distributed among multiple computing nodes. For example, a network addressable device 220 may host a portion of a data rule set and a network edge device 218 or network service 204 may host the other portion of the data rule set.

In some examples, other attributes of computing nodes, such as physical locations of the computing nodes and services available on the computing nodes may be used in selecting a computing node to host a data rule set. For example, a customer may select a computing node based in part on the physical location of a computing node. For instance, some actions related to data generated by a network addressable device 220 may be performed prior to sending the data to a network service 204 in a computing service environment 202, such as an alarm trigger, or a notification. As such, the customer may evaluate the attributes of computing nodes to identify a computing node that may be close in proximity to where data is generated by a network addressable device 220. As a specific example, a network edge device 218 may be selected to host data rule set based in part on the physical location of the network edge device 218 to a network addressable device 220. As another example, a data rule set may be dependent on a service to analyze, process, and/or transform data generated by a network addressable device 220. For example, a network addressable device located on a vehicle may utilize a network service 204 to generate predictive maintenance alerts for the vehicle. In such a case, a customer may identify a computing node (e.g., a network service 204) that includes the service by analyzing the attributes of the computing nodes.

As another example, a customer may select a computing node (e.g., network service 204, a network edge device 218, or a network addressable device 220) included in the multi-tiered data processing service that has a computing node classification that corresponds with a data rule set classification. A classification may be assigned to a data rule set and/or a computing node included in the multi-tiered data processing service by a customer, a computing service provider, or via analysis as described later in association with FIG. 4. Illustratively, computing node classifications may include, but are not limited to: processor capacity, memory capacity, network bandwidth capacity, data storage capacity, battery capacity, or computing node physical location. A data rule set's classifications may include, but are not limited to: data rule complexity, computing resource allocation, data rule execution time, or physical execution location.

As an illustration of using a data rule set classification to identify a computing node that corresponds with the data rule set classification, a data rule set classification may include computing capacity specifications that enable aggregation of data received from multiple network addressable devices 220 and sending the aggregated data to a network service 204 in the computing service environment 202. The data rule classification of "aggregation" may be used to identify a computing node that has a classification of "aggregation" that matches the data rule classification, for example, a network edge device 218 that includes computing capacity that can be used to aggregate data and forward the aggregated data to a network service 204. As another illustration, a network addressable device 220 may be classified as having the computing capacity to execute data rules sets comprising simple decision trees and a network service 204 may be classified as having the computing capacity to execute data rule sets comprising complex machine learning random forest models.

After a computing node has been selected to host a data rule set (e.g., by a computing service customer, a computing service provider, or dynamically), the data rule set may be deployed to the computing node. The computing node may have a rules engine used to execute the data rule set, or a rules engine may be deployed to the computing node along with the data rule set. For example, the data rule set deployment service 216 may be used to deploy a data rule set (or a portion thereof) to a network service 204 in the computing service environment 202, a network edge device 218, or to a network addressable device 220. Data generated by a network addressable device 220 may be provided to the selected computing node and the data may be analyzed and/or processed using the data rule set.

Figure 3:
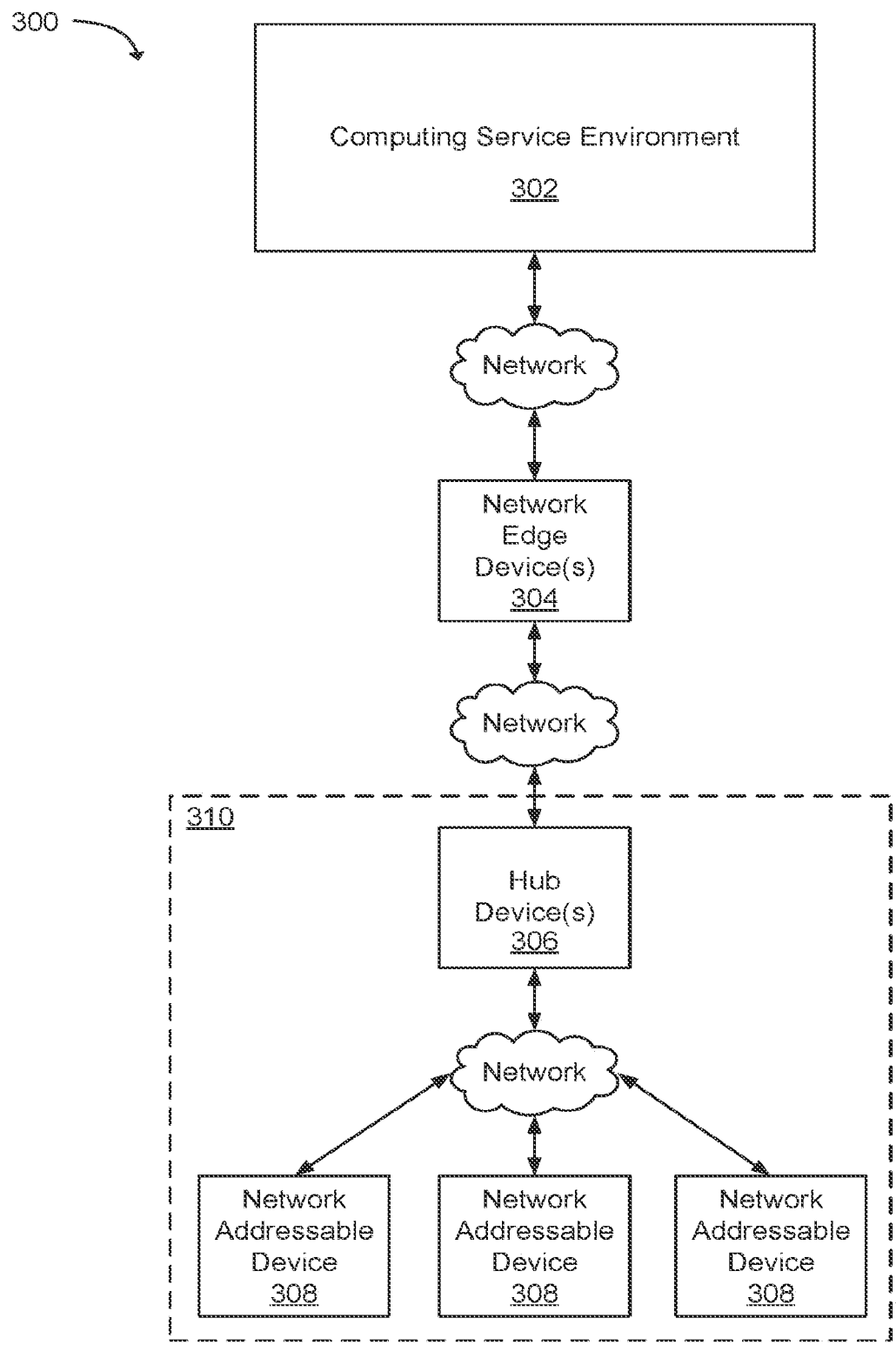
FIG. 3 is a block diagram illustrating an example system for a multi-tiered data processing service that includes one or more hub devices.

FIG. 3 is a block diagram illustrating an example system 300 for a multi-tiered data processing service that includes a hub device(s) 306 that may be located at a local site 310 (e.g., a customer location) and may be in communication with network addressable devices 308 operating at the local site 310. A hub device 306 may be in network communication with other computing nodes included in the multi-tiered data processing service. As illustrated, a hub device 306 may be in communication with network addressable devices 308 and may be connected to one or more network edge devices 304 that are in network communication with a computing service environment 302 (e.g., a "cloud" computing service).

In one example, data generated by the network addressable devices 308 may be sent to the hub device 306, which may be configured to analyze, process, or transform the data using a data rule set, and forward the data to the computing service environment 302 according to the data rule set. The hub device 306 may be connected to the network addressable devices 308 via a computer network, which may include Wireless Local Area Network (WLAN), Wide Area Network WAN, a short-range network protocol (e.g., BLUETOOTH, BLE (BLUETOOTH Low Energy), ZIGBEE), as well as other communication protocols used to create short-range area networks.

In one example, a hub device 306 may be used to manage network addressable devices 308 connected to the hub device 306. For example, a hub device 306 may be used at a customer location and may be used to manage simple tasks associated the customer network addressable devices 308 and may offload more complex tasks to a computing service environment 302. As an illustration, a hub device 306 may be used to manage network addressable semi-autonomous machines (robots). The semi-autonomous machines may have a limited amount of computing capacity that allows a semi-autonomous machine to make a local decision (e.g., avoid physical objects), but may send data to the hub device 306 that uses a data rule set to make more complex decisions regarding the semi-autonomous machines.

A hub device 306 may be configured to offload some of the hub device's workload to network services included in the computing service environment 302 by sending data received from network addressable devices 308 to a higher tiered computing node than the hub device 306, such as a network edge device 304 or a computing service environment 302 for analysis, processing, or transformation of the data. In another example, a hub device 306 may be configured to perform traffic shaping using a data rule set by controlling an amount of data or a data format for data which is sent to higher tiered computing nodes than the hub device 306 or sent back to network addressable devices 308. As an illustration, a hub device 306 located on an oceangoing vessel may be configured (via a data rule set) to decide a data format (e.g., raw data or summarized data) in which to send data generated by network addressable devices 308 located on the ship based in part on the availability and strength of a satellite data link to a higher tiered computing node.

Figure 4:
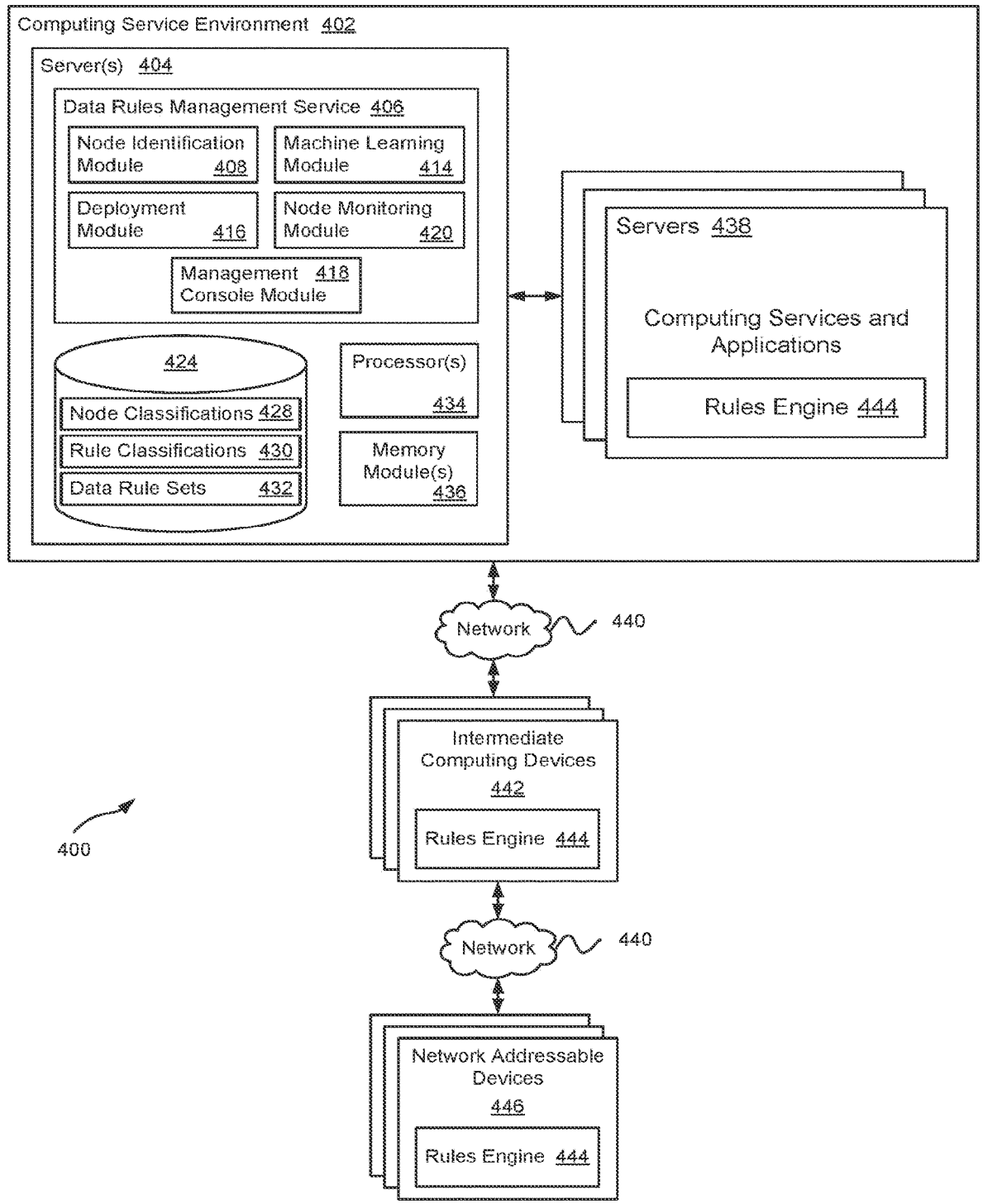
FIG. 4 is a block diagram that illustrates various example components included in a system for a multi-tiered data processing service.

FIG. 4 illustrates components of an example system 400 environment on which the present technology may be executed. The system 400 may support a multi-tiered data processing service that includes network addressable devices 446, intermediate computing devices 442 (e.g., hub devices and network edge devices), and a computing service environment 402 offering computing services and applications to customers of the computing service environment 402. The computing service environment 402 may include computing resources for executing computing instances (e.g., virtual machines), which may be an instance of a software implementation of a machine (i.e. a computer) that executes applications like a physical machine.

The computing devices and services included in the multi-tiered data processing service may host a rules engine 444 that executes a data rule set used to analyze data generated by the network addressable devices 446. A rules engine 444 may be supplied by a computing service provider or a rules engine 444 may be developed by a computing service customer and certified for use within the multi-tiered data processing service by the computing service provider. Similarly, a data rule set 432 may be supplied by the computing service provider or by a computing service customer.

The computing service environment 402 may include servers 404/438 that may be in communication with intermediate computing devices 442 and network addressable devices 446 via a network 440. The servers 438 may host computing services and applications. The network addressable device 446 may send data to any of the intermediate computing devices 442 and/or the servers 438 that host the computing services and applications, and the data may be analyzed, processed, and/or transformed using a rules engine 444 and data rule set 432 located on the intermediate computing devices 442 and/or the servers 438. In some examples, a network addressable device 446 may communicate with the servers 438 included in the computing service environment 402 without having to go through an intermediate computing device 442.

The server(s) 404 may contain a data rules management service 406 that includes a number of modules used to manage and deploy data rule sets 432 to the servers 438, intermediate computing devices 442, and/or network addressable devices 446. In one example, the data rules management service 406 may include a node identification module 408, a node monitoring module 420, a machine learning module 414, a deployment module 416, and a management console module 418.

The node identification module 408 may be configured to identify computing nodes included in a multi-tiered data processing service and obtain specifications for the computing nodes. For example, the node identification module 408 may be configured to create a network map of computing nodes (e.g., servers 438, intermediate computing devices 442, and network addressable devices 446) included in the multi-tiered data processing service that are accessible to a customer's network addressable devices 446 and obtain specifications for each of the computing nodes included in the network map. The specifications for the computing nodes may be used to classify the computing nodes into computing node classifications 428 according to, for example, computing capacity, location, networking conditions, available services and applications, physical location, and other attributes of the computing nodes. The computing node classifications 428 may be used in selecting a computing node to handle data generated by a network addressable device 446 using a data rule set. For example, a computing node having computing node classifications 428 that correspond with data rule classifications 430 for a data rule set 432 may be selected to host the data rule set 432.

In one example, a computing service customer may be presented with specifications for computing nodes (via a management console interface) obtained using the node identification module 408 and the customer may select one or more of the computing nodes to host a data rule set used to analyze, process, and/or transform data generated by the customer's network addressable device(s) 446. In another example, a computing service provider may use the specifications to select a computing node to host a data rule set 432. In another example, the machine learning module 414 may use computing node specifications in combination with other information (e.g., historical data, feedback loop data, etc.) to identify one or more computing nodes to host a data rule set 432 and handle data received from network addressable devices 446 using the data rule set 432. For example, a computing node may be identified using a machine learning model and computing node features (e.g., computing capacity features, physical location features, application and service features, etc.) and data rule set features (e.g., rule complexity features, execution time features, physical execution location features, etc.). The machine learning model may be configured to evaluate the computing node features and the data rule set features and identify a computing node that has features that correspond with the computing node features and the data rule set features. Non-limiting examples of machine learning models include decision tree models, support-vector machines, decision tree models, random forest models, regression, and the like.

After a computing node (e.g., server 438, intermediate computing device 442, or network addressable device 446) has been selected to host a data rule set 432, the data rule set 432 may be deployed to the selected computing node using the deployment module 416 configured to retrieve the data rule set 432 from a data store 424 and transfer the data rule set 432 to the computing node. Also, the deployment module 416 may be configured to determine whether a selected computing node includes a rules engine 444 used to execute the data rule set 432, and in the case that the computing node does not include the rules engine 444, provide the rules engine 444 to the computing node. In one example, the deployment module 416 may instruct lower tiered computing nodes (i.e., computing nodes with comparatively less computing capacity, networking capacity, etc. as compared to other computing nodes in the system) in the multi-tiered data processing service to forward data generated by network addressable devices 446 to a computing node identified to host a data rule set 432.

Figure 7:
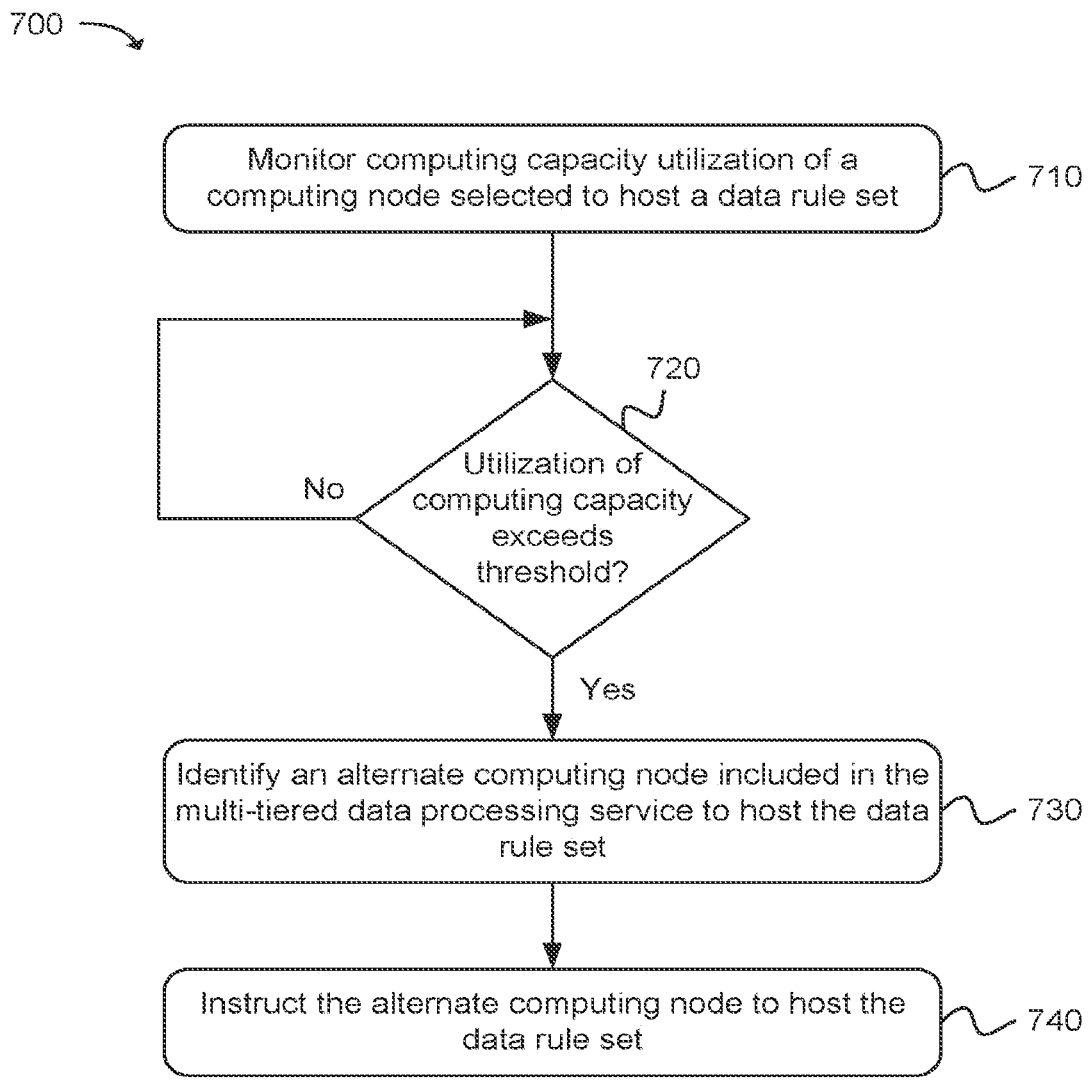
FIG. 7 is a flow diagram illustrating an example method for monitoring computing capacity for a computing node selected to host a data rule set to determine whether a computing capacity threshold has been exceeded.

The node monitoring module 420 may be configured to monitor execution of a data rule set 432 on a computing node selected to host the data rule set 432 and determine whether utilization of the computing node's computing capacity exceeds a computing capacity threshold (e.g., greater than 60% of the computing nodes total computing capacity) and identify an alternate computing node included in the multi-tiered data processing service to host the data rule set 432 as explained in greater detail later in association with FIG. 7. In another example, the node monitoring module 420 may be configured to monitor utilization of a computing node's computing capacity and determine whether utilization of the computing capacity exceeds a computing capacity threshold and forward the data generated by a network addressable device 446 to a higher tiered computing node (i.e., computing nodes with comparatively more computing capacity, networking capacity, etc. as compared to other computing nodes in the system) when the computing capacity threshold is exceeded.

The management console module 418 may be configured to provide a computing service customer with a management console interface that allows the customer to view specifications for computing nodes included in the multi-tiered data processing service and select a computing node to host a data rule set 432. For example, a graphical interface may be used to display multiple tiers of computing nodes according to computing capacity and physical location of the computing nodes. Also, the management console interface may be used to submit data rule sets 432 and rules engines 444 developed by a computing service customer to the data rules management service 406. The management console interface may be accessible via an API. A customer may utilize a client device to access the management console interface. The client device may comprise, for example, a processor-based system such as a computing device that includes, but not limited to, a desktop computer, laptop or notebook computer, tablet computer, mainframe computer system, handheld computer, workstation, network computer, or other devices with like capability.

The various processes and/or other functionality contained within the system 400 may be executed on one or more processors 434 that are in communication with one or more memory modules 436. The system 400 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object-oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the computing service environment 402 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 440 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 4 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 4 illustrates an example of a system that may implement the techniques above, many other similar or different environments are possible. The example environments discussed and illustrated above are merely representative and not limiting.

Figure 5:
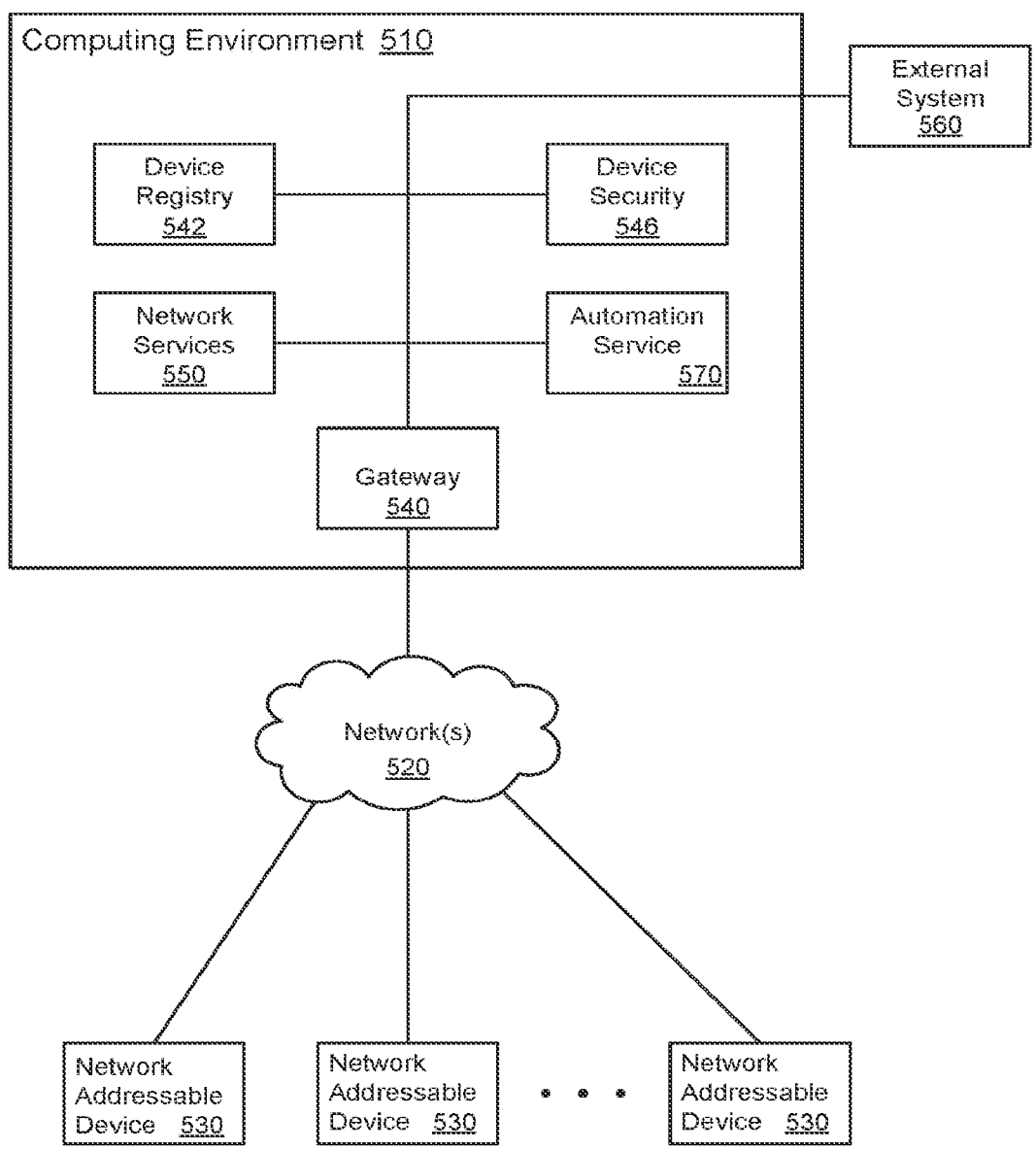
FIG. 5 is a block diagram illustrating an example computer networking architecture for providing network addressable devices access to network services.

FIG. 5 is a diagram illustrating an example computing environment 510 with which network addressable devices 530 may communicate. The computing environment 510, which may be referred to as a device communication environment or system, comprises various resources that are made accessible via gateway server 540 to the network addressable devices 530 that access the gateway server 540 via a network 520. The network addressable devices 530 may access the computing environment 510 in order to access services such as data storage and computing processing features. Services operating in the computing environment 510 may communicate data and messages to the network addressable devices 530 in response to requests from devices and/or in response to computing operations within the services.

The computing environment 510 comprises communicatively coupled component systems 540, 542, 546, 550 and 570 that operate to provide services to the network addressable devices 530. The gateway server 540 may be programmed to provide an interface between the network addressable devices 530 and the computing environment 510. The gateway server 540 receives requests from the network addressable devices 530 and forwards corresponding data and messages to the appropriate systems within the computing environment 510. Likewise, when systems within the computing environment 510 attempt to communicate data instructions to the network addressable devices 530, the gateway server 540 routes those requests to the correct network addressable device 530.

The gateway server 540 may be adapted to communicate with varied network addressable devices 530 using various different computing and communication capabilities. For example, the gateway server 540 may be adapted to communicate using either TCP (Transmission Control Protocol) or UDP (User Datagram Protocol) protocols. Likewise, the gateway server 540 may be programmed to receive and communicate with the network addressable devices 530 using any suitable protocol including, for example, MQTT (Message Queue Telemetry Transport), CoAP (Constrained Application Protocol), HTTP (Hyper Text Transport Protocol), and HTTPS (Hyper Text Transport Protocol Secure). The gateway server 540 may be programmed to convert the data and instructions or messages received from the network addressable devices 530 into a format that may be used by other of the server systems comprised in the computing environment 510. In one example, the gateway server 540 may be adapted to convert a message received using the HTTPS protocol into a JSON (JavaScript Object Notation)

formatted message that is suitable for communication to other servers within the computing environment 510.

The gateway server 540 may store, or may control the storing, of information regarding the network addressable devices 530 that have formed a connection to the particular gateway server 540 and for which the particular gateway server 540 may be generally relied upon for communications with the network addressable device 530. In one example, the gateway server 540 may have stored thereon information specifying the particular network addressable device 530 such as a device identifier. For each connection established from the particular network addressable device 530, the gateway server 540 may also maintain information identifying the connection. For example, a connection identifier may be generated and stored for each connection established with a particular network addressable device 530. Information relating to the particular connection may also be stored. For example, information identifying the particular socket of the gateway server 540 on which the connection was established, as well as information identifying the particular protocol used by the network addressable device 530 on the connection may be stored by the gateway server 540. Information such as the socket and protocol may be used in order to facilitate further communications via the particular connection.

In one example, the gateway server 540 may communicate via any suitable networking technology with a device registry server 542. The device registry server 542 may be adapted to track the attributes and capabilities of each network addressable device 530. In an example, the device registry sever 542 may be provisioned with information specifying the attributes of the network addressable devices 530. For instance, a network addressable device 530 may be registered with the device registry by providing a device identifier and a device type for the network addressable device 530. In some examples, a beacon device may be registered with the device registry 542 by providing a beacon identifier and beacon attributes for the beacon device. Beacon attributes may include latitude and longitude coordinates, indoor floor level, and a location identifier.

The automation service server 570 may comprise data specifying rules or logic (e.g., automation rules) for handling various requests that may be received from the network addressable devices 530. The automation service server 570 may be programmed to convert specialized device functions or commands received in particular communication protocols such as, for example HTTPS, MQTT, CoAP, into functions or commands using particular protocols that are understood by other of the servers in the computing environment 510. In one example, the automation service server 570 may be provisioned with information specifying that upon receipt of a particular request from a particular network addressable device 530, a request should be made to store the payload data of the request in a particular network service server 550. The automation service server 570 may be similarly programmed to receive requests from servers 542, 550 and convert those requests into commands and protocols understood by the network addressable devices 530.

The device security server 546 maintains security-related information for the network addressable devices 530 that connect to the computing environment 510. In one example, the device security server 546 may be programmed to process requests to register devices with the computing environment 510. For example, entities such as device manufacturers, may forward requests to register network addressable devices 530 with the computing environment 510. The device security server 546 receives registration requests and assigns unique device identifiers to network addressable devices 530 that use the device identifiers on subsequent requests to access the computing environment 510. The device security server 546 stores, for each registered device, authentication information that may be provided during the device registration process. For example, a request to register a network addressable device 530 may comprise information identifying the network addressable device 530 such as a device serial number and information for use in authenticating the network addressable device 530. In one example, the information may comprise a digital certificate and may comprise a public key of a public key-private key pair. The information may be stored in relation to the assigned device identifier for the particular network addressable device 530. When the network addressable device 530 subsequently attempts to access the computing environment 510, the request may be routed to the device security server 546 for evaluation. The device security server 546 determines whether authentication information provided in the request is consistent with the authentication information stored in relation to the device identifier and provided during the registration process.

The device security server 546 may be further programmed to process request to associate particular entities (individuals or organizations) with particular network addressable devices 530. The device security server 546 may be adapted to receive requests to register entities, which may be, for example, individuals, users, accounts, and/or organizations, as authorized to control or communicate with a particular network addressable device 530. In one example, a request may be received from an individual or organization that may have purchased a network addressable device 530 from a manufacturer. For example, the device may be a dishwasher, thermostat, or lighting assembly that an individual or organization purchased from the manufacturer. The individual or organization may initiate a request to register the network addressable device 530 with the individual or an organization with which the organization is associated. The request may be routed to a web services server, which may be comprised in computing environment 510 or which communicates the request to the computing environment 510. The request identifies the network addressable device 530 and the particular entity (individual or organization) that is requesting to be associated with the network addressable device 530. In one example, the request may comprise a unique device identifier that was assigned when the network addressable device 530 was registered with the system. The request further may comprise information uniquely identifying the entity that is registering as having authority to communicate with and/or control the particular network addressable device 530.

The device security server 546 stores the information identifying the particular entity in relation with the device identifier. When the particular entity subsequently attempts to control or communicate data to the particular network addressable device 530, the device security server 546 may use the information to confirm that the particular entity is authorized to communicate with or control the particular network addressable device 530. When an entity that has not been registered as being authorized to communicate with the network addressable device 530 attempts to communicate with or control the network addressable device 530, the device security server 546 may use the information stored in the device security server 546 to deny the request.

A network services server 550 may be any resource or processing server that may be used by any of servers 540, 542, 546, or 570 in processing requests from the network addressable devices 530. In one example, network services server 550 may provide data storage and retrieval services and/or on-demand processing capacity. In an example scenario, the network services server 550 may be any of numerous network accessible services including, for example, web or cloud-based services. In one example, the web services server 550 may be programmed to provide particular processing for particular network addressable devices 530 and/or groups of network addressable devices 530. For example, a network services server 550 may be provisioned with software that coordinates the operation of a particular set of network addressable devices 530 that control a particular manufacturing operation.

Servers 540, 542, 546, 550, and 570 may be communicatively coupled via any suitable networking hardware and software. For example, the servers may communicate via a local area network or wide area network.

An external system 560 may access computing environment 510 for any number of purposes. In one example, an external system 560 may be a system adapted to forward requests to register network addressable devices 530 with the computing environment 510. For example, an external system 560 may include a server operated by or for a device manufacturer that sends requests to computing environment 510, and device security server 546 in particular, to register network addressable devices 530 for operation with computing environment 510. Similarly, the external system 560 may be a system operated to provide a gateway for entities (individuals or organizations) to register an ownership or control relationship with a particular network addressable device 530.

The network addressable devices 530 may be any devices that may be communicatively coupled via a network 520 with the computing environment 510. For example, the network addressable devices 530 may be computing devices such as smart phones and tablet computers, automobiles, appliances such as washers and driers, industrial sensors, switches, control systems, etc. In one example, each of network addressable devices 530 may communicate over the network 520 to store data reflecting the operations of the particular network addressable device 530 and/or to request processing provided by, for example, network services server 550. While FIG. 5 depicts three network addressable devices 530, it will be appreciated that any number of network addressable devices 530 may access the computing environment 510 via the gateway server 540. Further it will be appreciated that the network addressable devices 530 may employ various different communication protocols. For example, some network addressable devices 530 may transport data using TCP, while others may communicate data using UDP. Some network addressable devices 530 may use MQTT, while others may use CoAP, and still others may use HTTPs. It will also be appreciated that each of network addressable devices 530 may be programmed to send and receive particular functions or commands in its requests that are not compatible with other devices or even the systems within computing environment 510. The gateway server 540 may be programmed to receive and, if needed, attend to converting such requests for processing with the computing environment 510.

Figure 6:
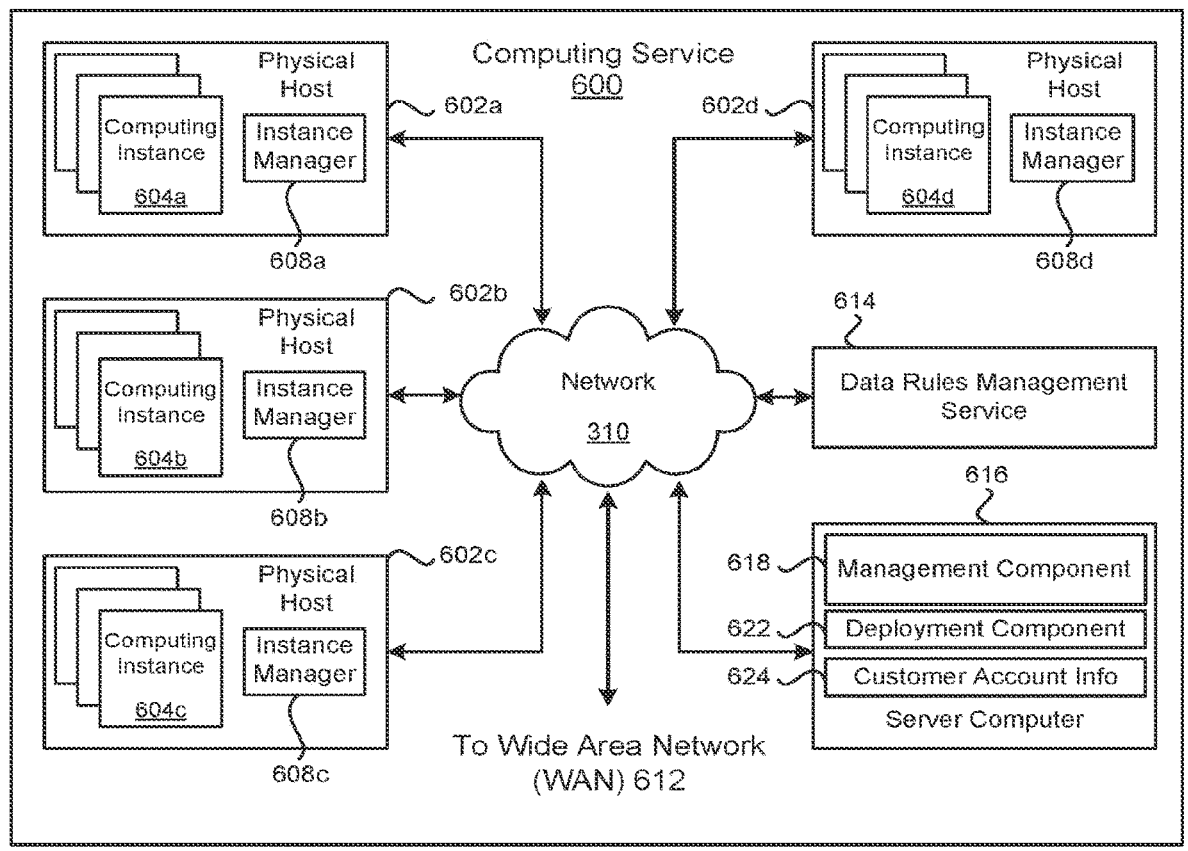
FIG. 6 is a block diagram that illustrates an example computing service environment that includes a data rules management service.

FIG. 6 is a block diagram illustrating an example computing service 600 that may be used to execute and manage a number of computing instances 604a-d. In particular, the computing service 600 depicted illustrates one environment in which the technology described herein may be used. The computing service 600 may be one type of environment that includes various virtualized service resources that may be used, for instance, to host computing instances 604a-d.

The computing service 600 may be capable of delivery of computing, storage and networking capacity as a software service to a community of end recipients, including network addressable devices. In one example, the computing service 600 may be established for an organization by or on behalf of the organization. That is, the computing service 600 may offer a "private cloud environment." In another example, the computing service 600 may support a multi-tenant environment, wherein a plurality of customers may operate independently (i.e., a public cloud environment). Generally speaking, the computing service 600 may provide the following models: Infrastructure as a Service ("IaaS"), Platform as a Service ("PaaS"), and/or Software as a Service ("SaaS"). Other models may be provided. For the IaaS model, the computing service 600 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 600 that may be utilized in association with an end customer's network addressable devices that may be registered with the computing service 600. End customers may access the computing service 600 using networked client devices, such as desktop computers, laptops, tablets, smartphones, etc. running web browsers or other lightweight client applications, for example. Those familiar with the art will recognize that the computing service 600 may be described as a "cloud" environment.

The particularly illustrated computing service 600 may include a plurality of server computers 602a-d. While four server computers are shown, any number may be used, and large data centers may include thousands of server computers. The computing service 600 may provide computing resources for executing computing instances 604a-d. Computing instances 604a-d may, for example, be virtual machines. A virtual machine may be an instance of a software implementation of a machine (i.e. a computer) that executes applications like a physical machine. In the example of a virtual machine, each of the server computers 602a-d may be configured to execute an instance manager 608a-d capable of executing the instances. The instance manager 608a-d may be a hypervisor, virtual machine monitor (VMM), or another type of program configured to enable the execution of multiple computing instances 604a-d on a single server. Additionally, each of the computing instances 604a-d may be configured to execute one or more applications.

One or more server computers 614 and 616 may be reserved to execute software components for managing the operation of the computing service 600 and the computing instances 604a-d. For example, a server computer 614 may execute a data rules management service as described in FIG. 4.

A server computer 616 may execute a management component 618. A customer may access the management component 618 to configure various aspects of the operation of the computing instances 604a-d purchased by a customer.

For example, the customer may setup computing instances 604*a-d* and make changes to the configuration of the computing instances 604*a-d*.

A deployment component 622 may be used to assist customers in the deployment of computing instances 604*a-d*. The deployment component 622 may have access to account information associated with the computing instances 604*a-d*, such as the name of an owner of the account, credit card information, country of the owner, etc. The deployment component 622 may receive a configuration from a customer that includes data describing how computing instances 604*a-d* may be configured. For example, the configuration may include an operating system, provide one or more applications to be installed in computing instances 604*a-d*, provide scripts and/or other types of code to be executed for configuring computing instances 604*a-d*, provide cache logic specifying how an application cache should be prepared, and other types of information. The deployment component 622 may utilize the customer-provided configuration and cache logic to configure, prime, and launch computing instances 604*a-d*. The configuration, cache logic, and other information may be specified by a customer accessing the management component 618 or by providing this information directly to the deployment component 622.

Customer account information 624 may include any desired information associated with a customer of the multi-tenant environment. For example, the customer account information may include a unique identifier for a customer, a customer address, billing information, licensing information, customization parameters for launching instances, scheduling information, etc. As described above, the customer account information 624 may also include security information used in encryption of asynchronous responses to API requests. By "asynchronous" it is meant that the API response may be made at any time after the initial request and with a different network connection.

A network 610 may be utilized to interconnect the computing service 600 and the server computers 602*a-d*, 616. The network 610 may be a LAN and may be connected to a WAN 612 or the Internet, so that end customers may access the computing service 600. The network topology illustrated in FIG. 6 has been simplified, many more networks and networking devices may be utilized to interconnect the various computing systems disclosed herein.

Moving now to FIG. 7, a flow diagram illustrates an example method 700 for determining when an amount of computing capacity for a computing node used to execute a data rule set exceeds a threshold and instructing an alternate computing node to execute the data rule set when the threshold is exceeded. Starting in block 710, computing capacity utilization of a computing node selected to host a data rule set may be monitored. For example, a data rules management service may be configured to monitor the computing node, or a computing node may be configured to monitor utilization of the computing node's own computing capacity. Utilization of the computing node's computing resources, such as processor, memory, and network throughput, may be monitored to determine what amount of the computing resources are being used to analyze, process, and/or transform data generated by a network addressable device.

As in block 720, in the case that utilization of the computing capacity exceeds a computing capacity threshold, then as in block 730, an alternate computing node included in the multi-tiered data processing service having computing capacity to host the data rule set may be identified. As in block 740, the alternate computing node may be instructed to host the data rule set. In one example, a data rule set may be deployed to multiple computing nodes and one of the computing nodes may be selected to handle data received by a network addressable device using the data rule set. In the case that the computing capacity threshold is exceeded on the computing device selected to handle the data, then the data may be forwarded to an alternate computing node that has the data rule set and the alternate computing node may handle the data generated by the network addressable device.

A computing capacity threshold may be determined by a computing service provider or by a computing service customer. As an example, a customer may set a threshold as 60%, 70%, or 80% and in the event that the threshold is exceeded, an alternate computing node may be identified. The alternate computing node may be specified in advance (e.g., by a customer or computing service provider), such that in the event that a computing capacity threshold is exceeded, the alternate computing node may already be known. The alternate computing node may have a greater amount of computing capacity than the computing capacity of the computing node initially selected to host the data rule set.

Figure 8:
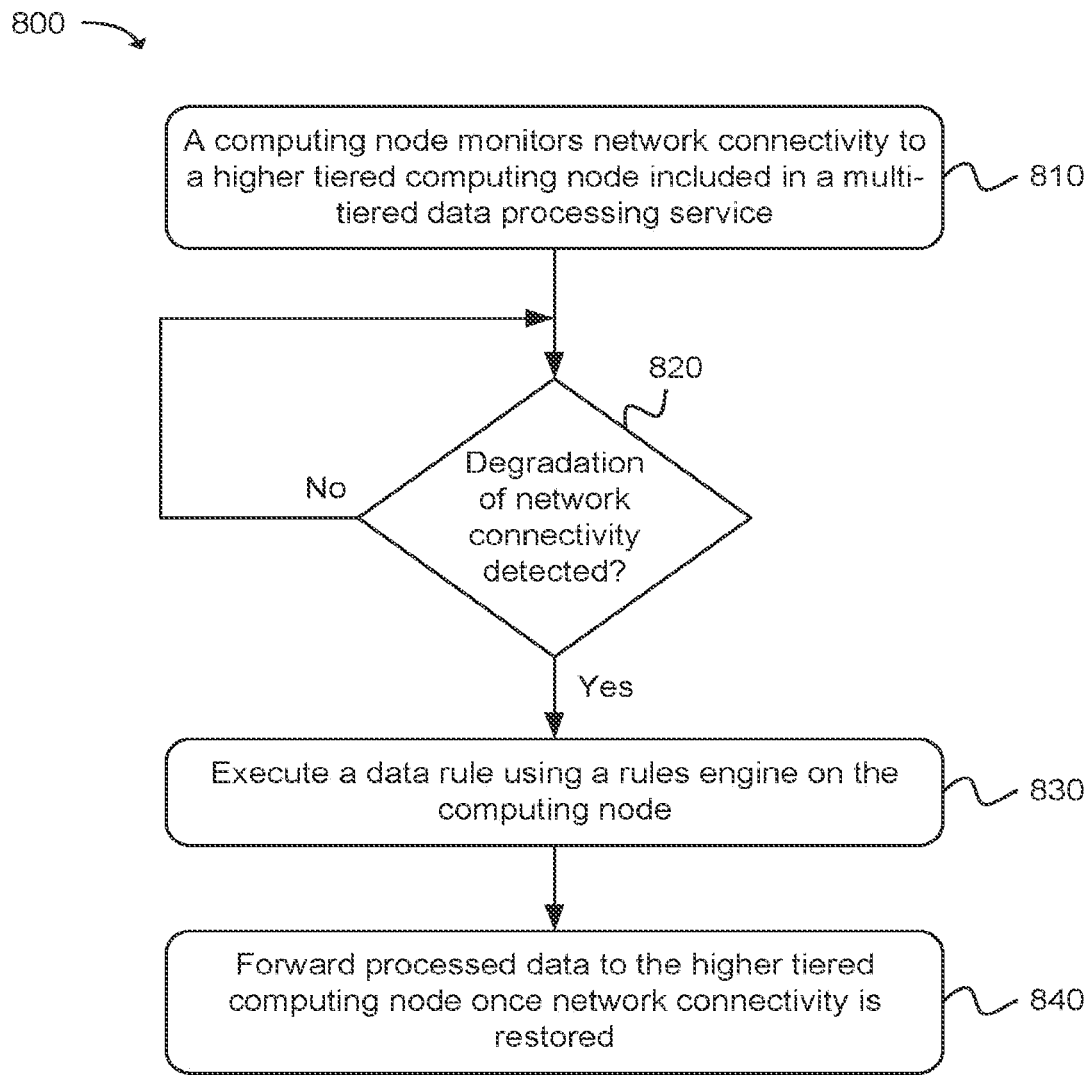
FIG. 8 is a flow diagram that illustrates an example method for monitoring network connectivity to a higher tiered computing node and determining whether to execute a data rule set based in part on the network connectivity.

FIG. 8 is a flow diagram that illustrates and example method 800 for monitoring network connectivity to a higher tiered computing node and determining whether to execute a data rule set based in part on the network connectivity. As in block 810, a computing node may be configured to monitor network connectivity to a higher tiered computing node included in a multi-tiered data processing service. For example, the computing node may monitor connectivity to a WAN or LAN network connection, a cellular network connection, a satellite network connection, and the like. As an illustration, a computing node located on a ship or offshore oil platform may be configured to monitor satellite bandwidth used to send data generated by one or more network addressable devices to a higher tiered computing node.

In monitoring network connectivity, the computing node may be configured to detect a degradation of network connectivity. As in block 820, in the event that a degradation of network connectivity to a higher tiered computing node may be detected, then as in block 830, the computing node may be configured to execute a data rule (e.g., a portion of a data rule set) using a rules engine on the computing node as a result of the degraded network connectivity. The data rule may, in one example, be configured to batch or aggregate data during periods that network connectivity may be lost. As an illustration, data may be batched during periods that a network addressable device may not be able to connect to a network service. Also, the network addressable device may execute a data rule that allows the network addressable device to act autonomously during periods that the network service may be unable to communicate with the network addressable device due to network connectivity problems.

As in block 840, after network connectivity has been restored (or has improved), data that has been processed by the computing node may be forwarded to the higher tiered computing node. In cases that a degradation of network connectivity may not result in a total loss of network connectivity, a data rule may be used to modify how data is sent to a higher tiered computing node. As an illustration, a data rule may be configured to adjust a data sample rate, batch data points, or prioritize data attributes prior to sending the data to a higher tiered computing node in response to a changing data throughput of a network.

Figure 9:
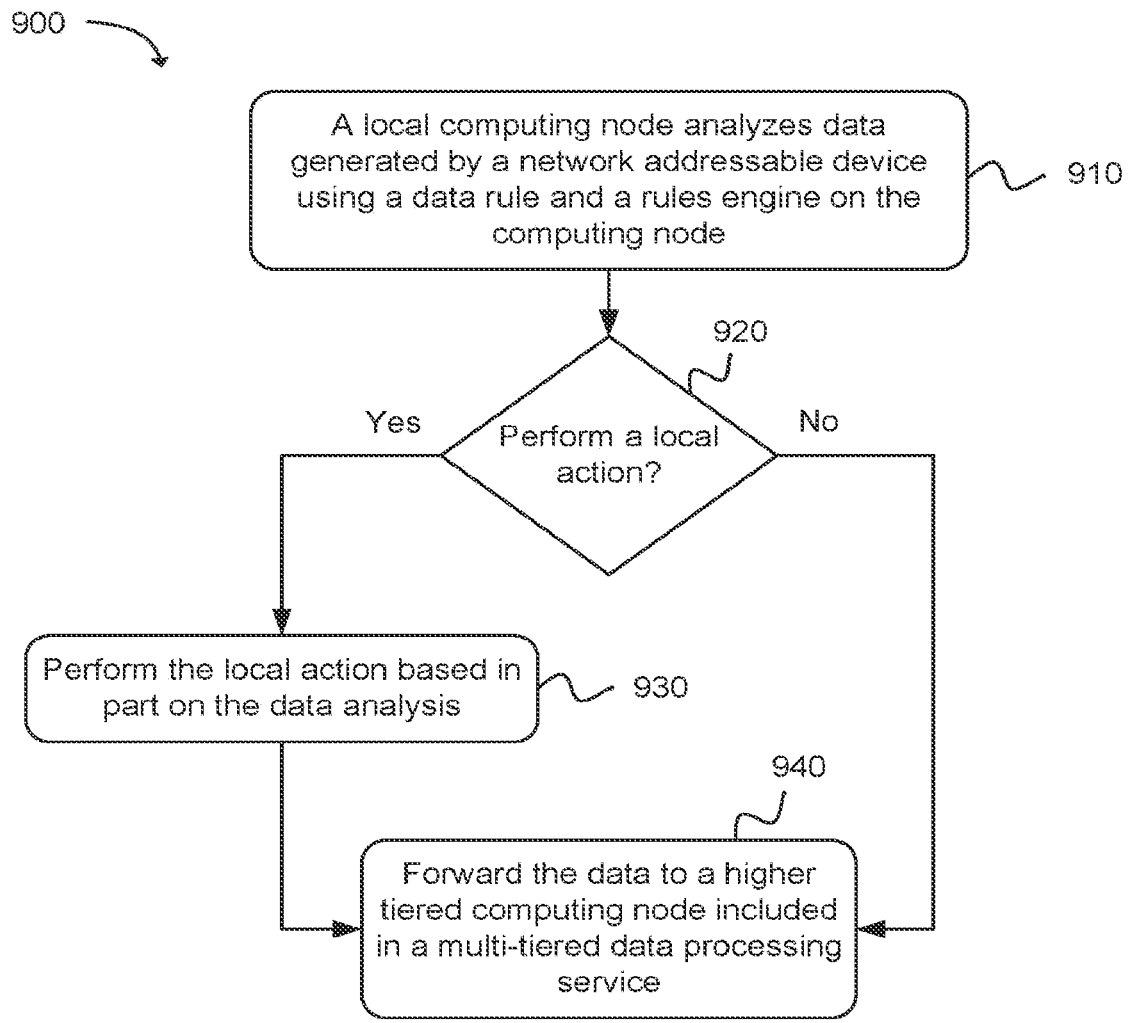
FIG. 9 is a flow diagram illustrating an example method for performing a local action based in part on analysis of data generated by a network addressable device.

FIG. 9 is a flow diagram illustrating an example method 900 for performing a local action based on analysis of data generated by a network addressable device and then forwarding the data to a higher tiered computing node for further analysis. A local action may refer to an action performed by a network addressable device or a computing node in relatively close proximity to the network addressable device, such as a hub device or a network edge device.

As in block 910, a local computing node may be configured to analyze data generated by a network addressable device using a data rule and a rules engine located on the computing node. Illustratively, the local computing node may be a network addressable device, a hub device, or a network edge device. Analysis of the data may show a need to perform an action prior to sending the data to a higher tiered computing node, such as a network service that operates in a computing service environment (e.g., the "cloud"). Examples may include data generated by a network addressable heart monitoring device or security system where a response to irregular data may be made locally, as opposed to sending the data to a network service and waiting for a response from the network service.

As in block 920, a determination may be made whether a local action may be performed according to analysis of the data. Illustratively, if analysis of heart monitoring data or security monitoring data shows irregularities, then a local action may be performed. In the case that a determination is made to perform a local action, then as in block 930, the local action may be performed based in part on the data analysis. In the example of a network addressable heart rate monitor, medical personal may be notified via an electronic notification system, or a pacemaker may be instructed to administer an electrical pulse. In the example of a network addressable security system, a notification may be sent to a cell phone and/or to a police department.

As in block 940, the data may be forwarded to a higher tiered computing node included in a multi-tiered data processing service. In the case that a local action was performed, the data may be forwarded to the higher tiered computing node for further analysis. In the example of a network addressable security system, after sending a notification alerting of a potential security problem, data (e.g., video data) may be sent to a network service that analyzes the data to determine whether an actual security event has, or is, occurring (e.g., analyze video data to detect an intruder).

Figure 10:
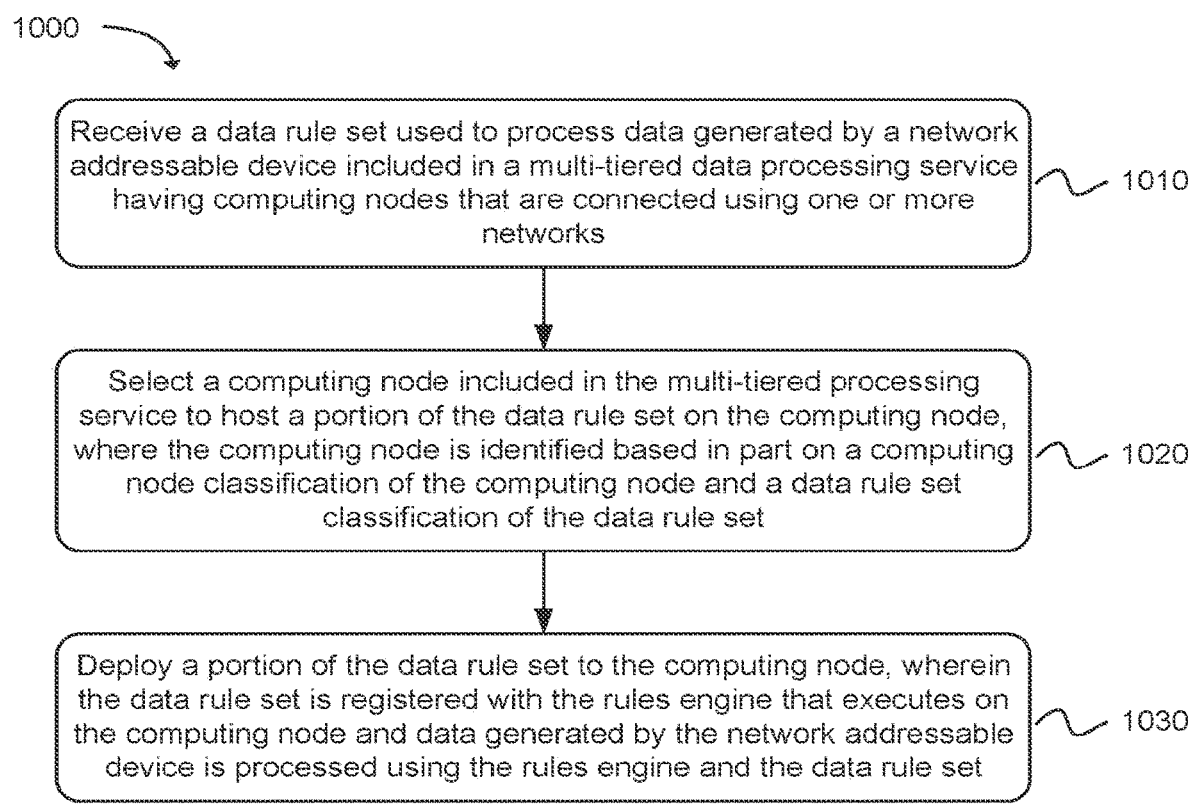
FIG. 10 is a flow diagram that illustrates an example method for operating a multi-tiered data processing service that manages a data rule set used to process data generated by a network addressable device.

FIG. 10 is a flow diagram that illustrates an example method 1000 for operating a multi-tiered data processing service that manages a data rule set used to process data generated by a network addressable device. As in block 1010, a data rule set may be received that may be used to process data generated by a network addressable device included in a multi-tiered data processing service having computing nodes that are connected using one or more networks, where the computing nodes may have computing capacities to execute a portion of the data rule set using a rules engine to analyze the data generated by the network addressable device.

As in block 1020, a computing node included in the multi-tiered processing service may be selected to host a portion of the data rule set on the computing node, where the computing node may be identified based in part on a computing node classification of the computing node and a data rule set classification of the data rule set. The computing node classifications may be based in part on at least one of: a processor capacity, a memory capacity, a network bandwidth capacity, a data storage capacity, a battery capacity, or a computing node physical location. The data rule set classification may be based in part on at least one of: a data rule complexity, a computing resource allocation, a data rule execution time, or a physical execution location.

As in block 1030, a portion of the data rule set may be deployed to the computing node, where the data rule set may be registered with the rules engine that executes on the computing node and data generated by the network addressable device may be processed using the rules engine and the data rule set. For example, the computing node identified to host the data rule set may be configured to analyze data generated by a network addressable device using a data rule set and a rules engine on the computing node and perform an action based in part on the analysis of the data generated by the network addressable device. The computing node may then forward the data generated by the network addressable device to a higher tiered computing node included in the multi-tiered data processing service for further analysis.

Figure 11:
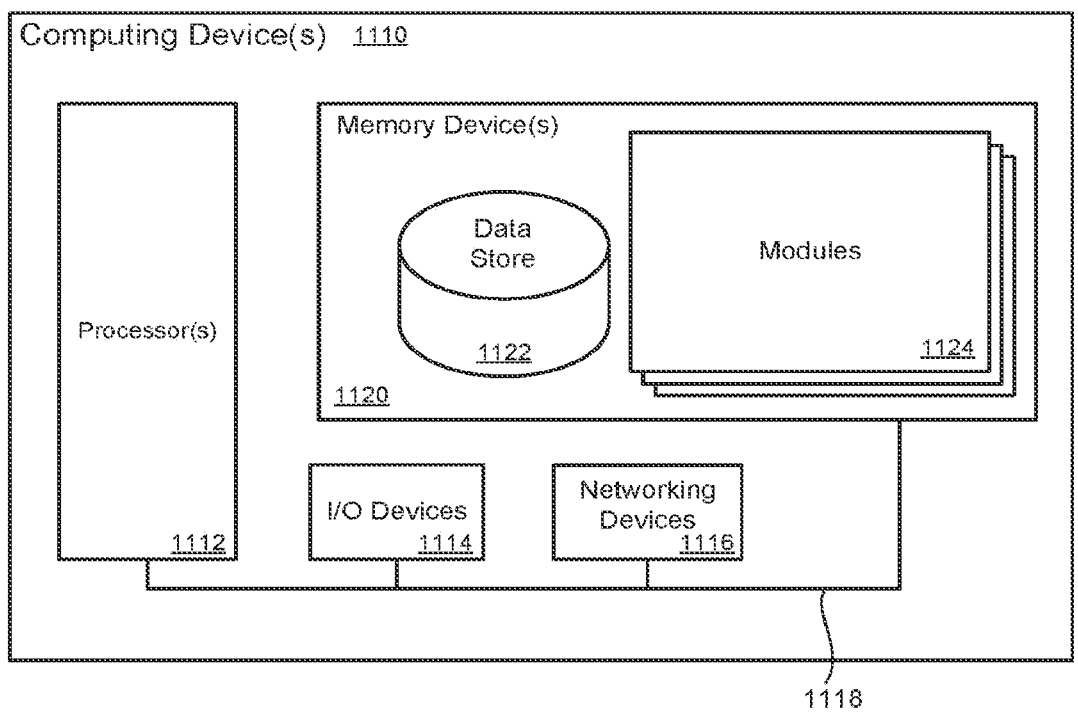
FIG. 11 is block diagram illustrating an example of a computing device that may be used to execute a multi-tiered data processing service.

FIG. 11 illustrates a computing device 1110 on which modules of this technology may execute. A computing device 1110 is illustrated on which a high-level example of the technology may be executed. The computing device 1110 may include one or more processors 1112 that are in communication with memory devices 1120. The computing device 1110 may include a local communication interface 1118 for the components in the computing device. For example, the local communication interface 1118 may be a local data bus and/or any related address or control busses as may be desired.

The memory device 1120 may contain modules 1124 that are executable by the processor(s) 1112 and data for the modules 1124. For example, the memory device 1120 may contain a node identification module, a deployment module, a node monitoring module, a management console module, as well as other modules. The modules 1124 may execute the functions described earlier. A data store 1122 may also be located in the memory device 1120 for storing data related to the modules 1124 and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. Networking devices 1116 and similar communication devices may be included in the computing device. The networking devices 1116 may be wired or wireless networking devices that connect to the internet, a LAN, WAN, or other computing network.

The components or modules that are shown as being stored in the memory device 1120 may be executed by the processor(s) 1112. The term "executable" may mean a program file that is in a form that may be executed by a processor 1112. For example, a program in a higher-level language may be compiled into machine code in a format that may be loaded into a random-access portion of the memory device 1120 and executed by the processor 1112, or source code may be loaded by another executable program and interpreted to generate instructions in a random-access portion of the memory to be executed by a processor. The executable program may be stored in any portion or component of the memory device 1120. For example, the memory device 1120 may be random access memory (RAM), read only memory (ROM), flash memory, a solid-state drive, memory card, a hard drive, optical disk, floppy disk, magnetic tape, or any other memory components.

The processor 1112 may represent multiple processors and the memory device 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations that comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium that may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein, and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system, comprising:
   at least one processor;
   at least one memory device including instructions that, when executed by the at least one processor, cause the system to:
   identify a data rule set used to process data generated by network addressable devices included in a data processing service ty having computing node tiers of computing nodes that are connected using one or more networks, wherein first computing nodes of a first computing node tier of the data processing service have a greater amount of computing capacity to execute the data rule set using a rules engine to process the data generated by the network addressable devices of the data processing service as compared to second computing nodes of a second computing node tier of the data processing service;

deploy the data rule set to a computing node included in a particular one of the computing node tiers, wherein data generated by one of the network addressable devices is processed using a rules engine of the computing node and the data rule set.

2. The system as in claim 1, wherein the at least one memory device further includes instructions that, when executed by the processor, causes the system to instruct computing nodes in the data processing service that receive the data generated by the network addressable device to forward the data generated by the network addressable device to the computing node.

3. The system as in claim 1, wherein the at least one memory device further includes instructions that, when executed by the processor, causes the system to:
monitor execution of the data rule set on the computing node;
determine that utilization of a computing capacity of the computing node exceeds a computing capacity threshold; and
identify an alternate computing node included in the data processing service to host the data rule set, wherein the alternate computing node has a greater amount of computing capacity than the computing capacity of the computing node.

4. The system as in claim 1, wherein the computing node is configured to:
analyze the data generated by the network addressable device using the data rule set and the rules engine;
perform an action based in part on the analysis of the data generated by the network addressable device; and
forward the data generated by the network addressable device to a higher tiered computing node included in the data processing service than that of the computing node for further analysis.

5. The system as in claim 1, wherein the at least one memory device further includes instructions that, when executed by the at least one processor, cause the system to:
select the computing node included in the particular computing node tier to host the data rule set.

6. The system as in claim 5, wherein the at least one memory device further includes instructions that, when executed by the at least one processor, cause the system to:
identify computing nodes included in the data processing service that forward the data generated by the network addressable devices to a network accessible computing service, wherein the computing node selected to host the data rule set is selected from the identified computing nodes.

7. The system as in claim 5, wherein to select the computing node, the at least one memory device further includes instructions that, when executed by the at least one processor, cause the system to:
select the computing node based at least in part on the particular computing node tier corresponding to a data rule set classification of the data rule set.

8. A computer implemented method, comprising:
identifying a data rule set used to process data generated by network addressable devices included in a data processing service having computing node tiers of computing nodes that are connected using one or more networks, wherein first computing nodes of a first computing node tier of the data processing service have a greater amount of computing capacity to execute the data rule set using a rules engine to process the data generated by the network addressable devices of the data processing service as compared to second computing nodes of a second computing node tier of the data processing service; and
deploying the data rule set to a computing node included in a particular one of the computing node tiers, wherein data generated by one of the network addressable devices is processed using a rules engine of the computing node and the data rule set.

9. The method as in claim 8, further comprising:
instructing computing nodes in the data processing service that receive the data generated by the network addressable device to forward the data generated by the network addressable device to the computing node.

10. The method as in claim 8, further comprising:
monitoring execution of the data rule set on the computing node;
determining that utilization of a computing capacity of the computing node exceeds a computing capacity threshold; and
identifying an alternate computing node included in the data processing service to host the data rule set, wherein the alternate computing node has a greater amount of computing capacity than the computing capacity of the computing node.

11. The method as in claim 8, further comprising performing, by the computing node:
analyzing, the data generated by the network addressable device using the rules engine and the data rule set;
performing an action based in part on the analysis of the data generated by the network addressable device; and
forwarding the data generated by the network addressable device to a higher tiered computing node included in the data processing service than that of the computing node for further analysis.

12. The method as in claim 8, further comprising:
receiving, from a customer, a selection of the computing node to host the data rule set.

13. The method as in claim 8, further comprising performing, by the computing node:
monitoring utilization of a computing capacity of the computing node;
determining that the utilization of the computing capacity of the computing node exceeds a computing capacity threshold of the computing node; and
forwarding the data generated by the network addressable device to a higher-tiered computing node than that of the computing node.

14. The method as in claim 8, further comprising performing, by the computing node:
aggregating data generated by a plurality of the network addressable devices; and
providing the aggregated data to a higher tiered computing node included in the data processing service than that of the computing node.

15. One or more non-transitory computer-accessible storage media storing program instructions that when executed on or across one or more processors cause the one or more processors to:
identify a data rule set used to process data generated by network addressable devices included in a data processing service having computing node tiers of computing nodes that are connected using one or more networks, wherein first computing nodes of a first computing node tier of the data processing service have a greater amount of computing capacity to execute the data rule set using a rules engine to process the data generated by the network addressable devices of the data processing service as compared to second computing nodes of a second computing node tier of the data processing service; and deploy the data rule set to a computing node included in a particular one of the computing node tiers, wherein data generated by one of the network addressable devices is processed using a rules engine of the computing node and the data rule set.

16. The one or more storage media as recited in claim 15, further comprising program instructions that when executed on or across the one or more processors cause the one or more processors to:

instruct computing nodes in the data processing service that receive the data generated by the network addressable device to forward the data generated by the network addressable device to the computing node.

17. The one or more storage media as recited in claim 15, further comprising program instructions that when executed on or across the one or more processors cause the one or more processors to:

monitor execution of the data rule set on the computing node;

determine that utilization of a computing capacity of the computing node exceeds a computing capacity threshold; and identify an alternate computing node included in the data processing service to host the data rule set, wherein the alternate computing node has a greater amount of computing capacity than the computing capacity of the computing node.

18. The one or more storage media as recited in claim 15, further comprising program instructions that when executed on or across the one or more processors cause the one or more processors to:

receive, from a customer, a selection of the computing node to host the data rule set.

19. The one or more storage media as recited in claim 15, further comprising program instructions that when executed on or across the one or more processors cause the one or more processors to:

select the computing node included in the particular computing node tier to host the data rule set based at least in part on the particular computing node tier corresponding to a data rule set classification of the data rule set.

20. The one or more storage media as recited in claim 15, further comprising program instructions that when executed on or across the one or more processors cause the one or more processors to:

identify computing nodes included in the data processing service that forward the data generated by the network addressable devices to a network accessible computing service; and select, from the identified computing nodes, the computing node to host the data rule set.

\* \* \* \* \*